(12) United States Patent
Buccinna et al.

(10) Patent No.: US 10,476,143 B1
(45) Date of Patent: Nov. 12, 2019

(54) ANTENNA FOR BASE STATION OF WIRELESS REMOTE-CONTROL SYSTEM

(71) Applicant: Lear Corporation, Southfield, MI (US)

(72) Inventors: Frank Buccinna, Livonia, MI (US); Kapil Jadhav, Maharashtra (IN); Riad Ghabra, Northville, MI (US); Osman Ahmed, Bloomfield Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/142,105

(22) Filed: Sep. 26, 2018

(51) Int. Cl.
| | | |
|---|---|---|
| *H01Q 1/32* | (2006.01) | |
| *H01Q 1/38* | (2006.01) | |
| *G07C 9/00* | (2006.01) | |
| *G08C 17/02* | (2006.01) | |
| *H01Q 1/48* | (2006.01) | |
| *B60R 25/24* | (2013.01) | |
| *H01Q 1/24* | (2006.01) | |

(52) U.S. Cl.
CPC ........... *H01Q 1/3241* (2013.01); *B60R 25/24* (2013.01); *G07C 9/00111* (2013.01); *G08C 17/02* (2013.01); *H01Q 1/246* (2013.01); *H01Q 1/38* (2013.01); *H01Q 1/48* (2013.01); *G08C 2201/93* (2013.01)

(58) Field of Classification Search
CPC .. H01Q 1/24; H01Q 1/48; H01Q 1/22; H01Q 1/52
USPC .................................. 340/5.61; 343/702, 846
See application file for complete search history.

(56) References Cited

U.S. PATENT DOCUMENTS

| | | | |
|---|---|---|---|
| 5,550,554 A | 8/1996 | Erkocevic | |
| 5,668,560 A * | 9/1997 | Evans | H01Q 1/42 |
| | | | 343/702 |
| 6,239,753 B1 * | 5/2001 | Kado | G08C 17/04 |
| | | | 343/702 |
| 6,339,402 B1 | 1/2002 | McKivergan | |
| 6,414,642 B2 | 7/2002 | Honda et al. | |
| 6,646,606 B2 | 11/2003 | Mikkola et al. | |
| 6,774,849 B2 * | 8/2004 | Umehara | H01Q 1/243 |
| | | | 343/700 MS |
| 6,850,200 B2 * | 2/2005 | Tracy | H01Q 9/0421 |
| | | | 343/700 MS |
| 6,958,732 B2 * | 10/2005 | Yuanzhu | H01Q 1/243 |
| | | | 343/702 |
| 6,958,737 B2 * | 10/2005 | Lee | H01Q 1/243 |
| | | | 343/702 |
| 7,046,199 B2 | 5/2006 | Montgomery et al. | |
| 7,050,011 B2 | 5/2006 | Ghabra et al. | |
| (Continued) | | | |

FOREIGN PATENT DOCUMENTS

| | | |
|---|---|---|
| DE | 102007055327 A1 | 6/2009 |
| EP | 2146393 A1 | 1/2010 |
| FR | 3028337 A1 | 5/2016 |

*Primary Examiner* — Nam V Nguyen
(74) *Attorney, Agent, or Firm* — Brooks Kushman P.C.

(57) ABSTRACT

An antenna for a receiver, a transmitter, and/or a transceiver of a base station of a wireless remote-control system is provided. The antenna includes a printed circuit board (PCB) and a metallic stamped antenna structure. The antenna structure is directly mounted on the PCB. The antenna structure includes a lineal antenna body and legs. The antenna body and the legs are unitary with one another. The legs extend from the antenna body and are mechanically mounted to the PCB to support the antenna body over the PCB with the antenna body lying above the PCB within a plane.

14 Claims, 3 Drawing Sheets

(56) References Cited

U.S. PATENT DOCUMENTS

| | | | |
|---|---|---|---|
| 7,075,484 B2 * | 7/2006 | Sung | H01Q 1/243 343/700 MS |
| 7,151,492 B2 * | 12/2006 | Iguchi | H01Q 1/243 343/700 MS |
| 7,180,448 B2 | 2/2007 | Suganthan et al. | |
| 7,183,985 B2 * | 2/2007 | Tseng | H01Q 1/2216 343/702 |
| 7,237,318 B2 | 7/2007 | Annamaa et al. | |
| 7,733,274 B2 | 6/2010 | Azulay et al. | |
| 8,004,465 B2 | 8/2011 | Schano | |
| 8,482,466 B2 | 7/2013 | Thiam et al. | |
| 8,711,039 B2 * | 4/2014 | Horisawa | H01Q 1/243 343/700 MS |
| 8,803,760 B2 | 8/2014 | Chakam et al. | |
| 9,136,594 B2 | 9/2015 | Shi et al. | |
| 9,287,626 B2 * | 3/2016 | Zou | H01Q 7/00 |
| 9,293,816 B2 * | 3/2016 | Samardzija | H01Q 1/42 |
| 9,472,846 B2 * | 10/2016 | Ng | H01Q 9/0421 |
| 10,230,152 B2 * | 3/2019 | Chiu | H01Q 1/2283 |
| 2002/0126051 A1 * | 9/2002 | Jha | H01Q 9/0421 343/702 |
| 2003/0107881 A1 * | 6/2003 | Muramatsu | H01Q 1/1207 361/818 |
| 2006/0001573 A1 * | 1/2006 | Kim | H01Q 1/243 343/702 |
| 2014/0253405 A1 * | 9/2014 | Leger | H01Q 9/0421 343/843 |

\* cited by examiner

ANTENNA FOR BASE STATION OF WIRELESS REMOTE-CONTROL SYSTEM

TECHNICAL FIELD

The present invention relates to the base station of a wireless remote-control system.

BACKGROUND

A wireless remote-control system includes a base station and a portable remote controller. The base station is at a target device. The remote controller is carried by a user. The base station and the remote controller wirelessly communicate with one another for remote control of the target device.

SUMMARY

An antenna having a printed circuit board (PCB) and a metallic stamped antenna structure is provided. The antenna structure is directly mounted on the PCB. The antenna structure includes a lineal antenna body and a plurality of legs. The antenna body and the legs are unitary with one another. The legs extend from the antenna body and are mechanically mounted to the PCB to support the antenna body over the PCB with the antenna body lying above the PCB within a plane.

The PCB includes a top side and a bottom side and a ground plane between the top and bottom sides. The legs include support legs, a ground leg, and a feed leg. The antenna body is supported by the legs over the top side of the PCB. The ground leg is electrically connected to the ground plane. The feed leg is electrically connected to an electrical component to thereby electrically connect the antenna to the electrical component. The electrical component is mounted either to the bottom side of the PCB or the top side of the PCB.

The electrical component electrically connected to the antenna may be a receiver, a transmitter, and/or a transceiver. The receiver, transmitter, and/or transceiver may be a part of a base station of a wireless remote-control system.

The support legs, the ground leg, and the feed leg are formed within a boundary of the antenna body.

The plane in which the antenna body lies within may be parallel to the PCB. The support legs, the ground leg, and the feed leg may have a same length such that the antenna body is spaced from the ground plane by a predetermined distance.

The legs are soldered to the PCB to be mechanically mounted to the PCB. The legs may be mechanically mounted to the PCB by using soldering, press fit pins, or mechanical contacts.

The antenna structure is made from a single metal blank having a planar profile. The legs are bent out from planar profile of the single metal blank within a boundary of the antenna body with the antenna body remaining in the planar profile of the single metal blank.

The antenna body may have a rectangular, square, oval, or circular configuration.

The antenna may be for ultra-high frequency (UHF) communications having an operating range between 300 MHz and 3 GHz including a preferred operating range between 300 MHz and 1 GHz.

A base station of a wireless remote-control system includes an electrical component, an antenna, and a controller. The electrical component is electrically connected to the antenna. The electrical component is a receiver for receiving communications via the antenna, a transmitter for transmitting communications via the antenna, and/or a transceiver for receiving and transmitting communications via the antenna. The controller is for controlling a function of a target device in accordance with the communications. The antenna includes a PCB and a metallic stamped antenna structure directly mounted on the PCB. The antenna structure includes a lineal antenna body and a plurality of legs. The antenna body and the legs are unitary with one another. The legs extend from the antenna body and are mechanically mounted to the PCB to support the antenna body over the PCB with the antenna body lying above the PCB within a plane.

DETAILED DESCRIPTION

Detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
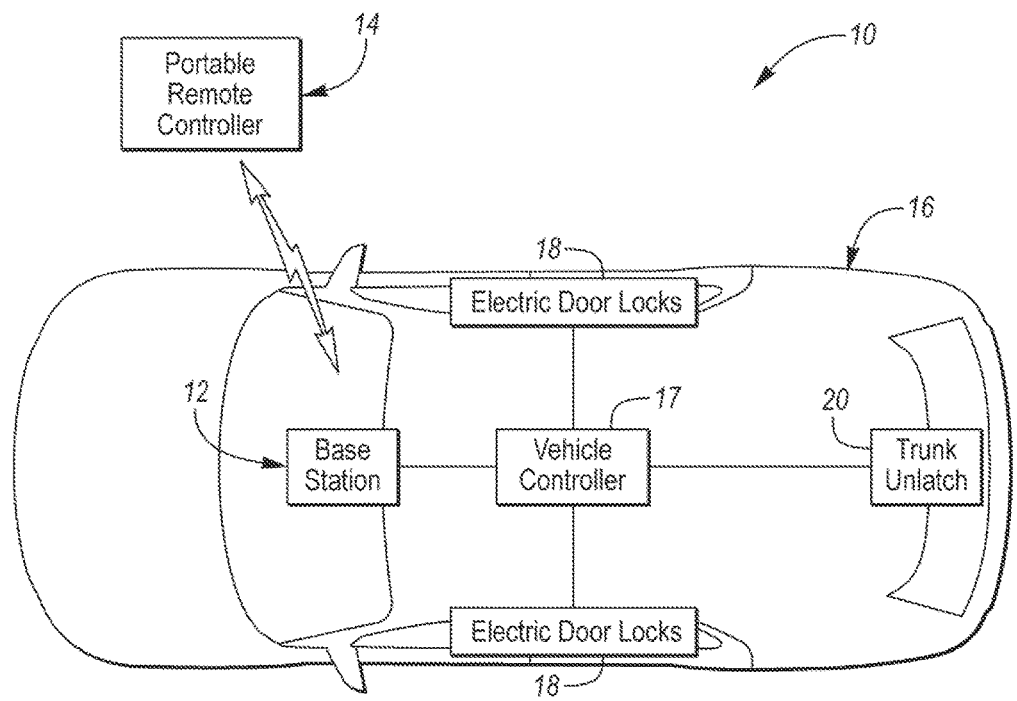
FIG. 1 illustrates a block diagram of an exemplary wireless remote-control system having a base station and a portable remote controller.

Referring now to FIG. 1, a block diagram of an exemplary wireless remote-control system 10 having a base station 12 and a portable remote controller 14 is shown. Base station 12 is at a target device 16. Target device 16 may be a vehicle, a house, a garage, a gate, a building, a door, a lighting system, or the like. Remote controller 14 is portable for being carried by a user. Remote controller 14 may be a key fob ("fob"), a smart phone, a tablet, a wearable device such as a smart watch, or the like.

In the description herein, as illustrated in FIG. 1, target device 16 will be assumed to be a vehicle and remote controller 14 will be assumed to be a fob. Base station 12 is configured to be able to control functions of vehicle 16 via an intermediary such as a vehicle controller 17. Base station 12 and fob 14 are operable for wirelessly transmitting/receiving signals to/from one another to enable the fob to remotely control vehicle 16 via the base station.

Remote-control system 10 may be configured to perform remote keyless entry (RKE) functions. RKE capability enables fob 14 to remotely control vehicle 16 in response to user actuation of switches, buttons, or the like of the fob. An example of a RKE function is base station 12 unlocking vehicle doors 18 in response to receiving an unlock door command from fob 14. Fob 14 transmits the unlock door command to base station 12 in response to corresponding user actuation of the fob. For instance, fob 14 includes an unlock door switch (not shown) disposed on a front face of the fob for the user to actuate. Another example of a RKE function is base station 12 unlatching a trunk latch 20 in response to receiving an unlatch trunk command from fob 14. Fob 14 transmits the unlatch trunk command to base station 12 in response to corresponding user actuation of an unlatch trunk switch (not shown) disposed on the front face of the fob.

Base station 12 can receive the RKE commands from fob 14 when vehicle 16 is within a broadcasting range of the fob. Base station 12 can transmit RKE communications (e.g., confirmation messages) to fob 14 when the fob is within the broadcasting range of vehicle 16. Fob 14 transmits the RKE commands and base station 12 transmits the RKE communications using radio-frequency (RF) communications. The RF communications involve ultra-high frequency (UHF) communications. The UHF operating frequency range is between 300 MHz to 3 GHz and includes a preferred 300 MHz to 1 GHz operating range.

Remote-control system 10 may be configured to perform passive entry passive start (PEPS) functions (or just passive entry (PE) functions or just passive start (PS) functions). PEPS capability enables remote-control system 10 to remotely control vehicle 16 automatically (or "passively") without user actuation of fob 14. An example of a passive entry function is base station 12 automatically unlocking vehicle doors 18 when the base station detects fob 14 (assumed to be authorized) to be close to vehicle 16. An example of a passive start function is base station 12 automatically starting vehicle 16 upon a user in possession of fob 14 pressing a start button on a dashboard of the vehicle (not shown).

Base station 12 can receive PEPS authorization communications from fob 14 (e.g., answers from the fob in response to challenge inquiries from the base station) when vehicle 16 is within a broadcasting range of the fob. Base station 12 processes the PEPS authorization communications from fob 14 to confirm that the fob is authorized to control vehicle 16. Base station 12 can transmit PEPS authorization communications to fob 14 (e.g., the challenge inquiries from the base station to the fob) when the fob is within the broadcasting range of vehicle 16. Fob 14 and base station 12 transmit the PEPS authorization communications using the UHF communications.

Figure 2:
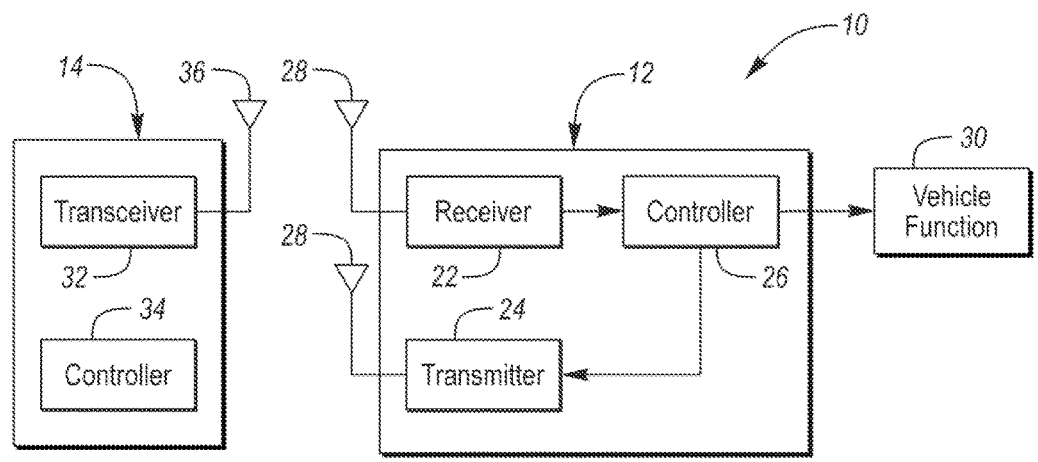
FIG. 2 illustrates a more descriptive block diagram of the base station and the portable remote controller of the exemplary wireless remote-control system.

Referring now to FIG. 2, with continual reference to FIG. 1, a more descriptive block diagram of base station 12 and fob 14 of remote-control system 10 is shown. Base station 12 includes a receiver 22, a transmitter 24, a controller 26, and an antenna 28. Receiver 22 and transmitter 24 could be combined to be, or replaced by, a transceiver. Receiver 22 and transmitter 24 are electrically connected to antenna 28. Antenna 28 may be co-located with receiver 22 and transmitter 24 at a given location within vehicle 16 or may be located remotely from the receiver and the transmitter at a remote location within the vehicle.

In other embodiments, only one of receiver 22 and transmitter 24 is electrically connected to antenna 28. In other embodiments, there are multiple antennas 28 such that receiver 22 is electrically connected to a respective one of the antennas and transmitter 24 is electrically connected to another respective one of the antennas.

In operation, receiver 22 receives, via antenna 28, RKE commands and/or PEPS authorization communications from fob 14. Controller 26 processes the received communications from fob 14 to confirm that the fob is authorized to control vehicle 16 and controls the actuation of a vehicle function 30 accordingly. Controller 26 is further operable to control transmitter 24 to transmit RKE response communications and/or PEPS polling/challenge communications to fob 14. Transmitter 24 transmits such communications using antenna 28 or other antennas (not shown) which may be located at various locations of vehicle 16.

Fob 14 includes a transceiver 32 and a controller 34. Transceiver 32 includes an antenna 36. Controller 34 is operable to control transceiver 32 to transmit RKE commands in response to user actuation of fob 14 and/or is operable to control transceiver 32 to transmit PEPS authorization communications in response to PEPS polling/challenge communications from base station 12.

Figure 3:
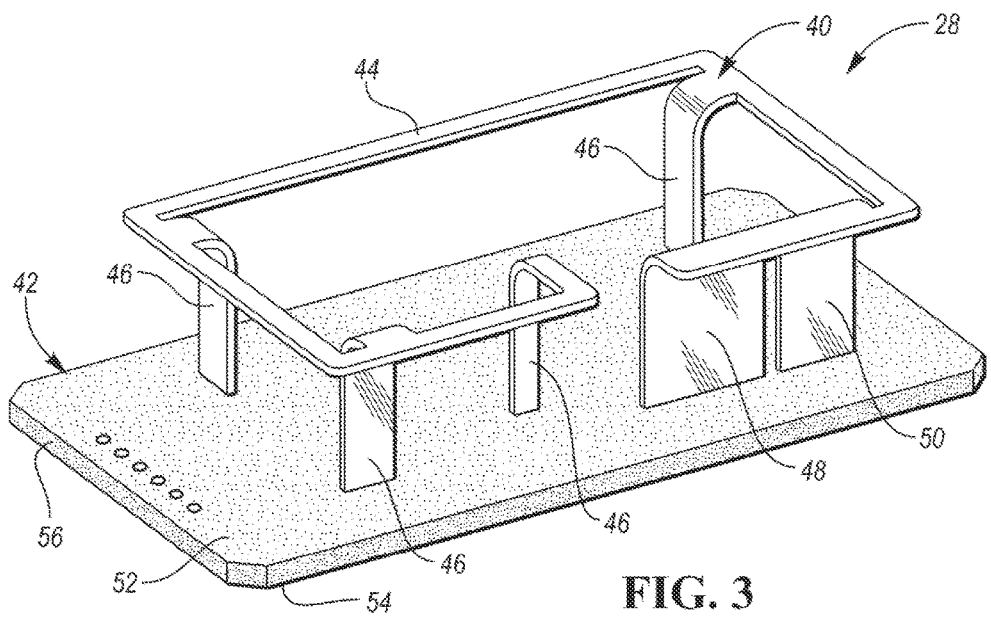
FIG. 3 illustrates a perspective view of an antenna of an electrical component of the base station, the electrical component is a receiver, a transmitter, and/or a transceiver.

Referring now to FIG. 3, a perspective view of antenna 28 is shown. Antenna 28 includes a metallic stamped antenna structure 40 and a printed circuit board (PCB) 42. Antenna structure 40 is mounted on PCB 42.

Antenna structure 40 is made from a single metal blank and has a metallic stamped design. Antenna structure 40 includes a lineal antenna body 44, a plurality of support legs 46, a ground leg 48, and a feed leg 50. Antenna body 44 and legs 46, 48, and 50 are unitary with one another.

PCB 42 includes a first (e.g., top) side 52 and an opposite second (e.g., bottom) side 54. PCB 42 further includes within its inner body a ground plane 56 between top and bottoms PCB sides 52 and 54. Ground plane 56 is electrically connected to RF ground (not shown). Ground plane 56 is constructed of copper or other similar material having enhanced electrically conductive properties.

Antenna body 44 lies above top side 52 of PCB 42 within a plane. The plane may be parallel to PCB 42 as shown in FIG. 3. Legs 46, 48, and 50 extend generally perpendicularly from antenna body 44 to PCB 42. Legs 46, 48, and 50 are mechanically mounted to PCB 42 to support antenna body 44 over PCB 42. Legs 46, 48, and 50 are mechanically mounted to PCB 42 by using soldering, press fit pins, or mechanical contacts. For example, legs 46, 48, and 50 are mechanically mounted to PCB 42 using reflow soldering rather than compliant pins or heat staking. The length of legs 46, 48, and 50 is predetermined such that antenna body 44 is spaced from ground plane 56 of PCB 42 by a predetermined distance. The predetermined distance is such that antenna 28 has a relatively low-profile and thereby occupies relatively little space.

As shown in FIG. 3, no dielectric spacer or platform other than air is between antenna body 44 and PCB 42. Likewise, as antenna body 44 is a lineal structure, no dielectric spacer or platform other than air is between the bounded interior of the antenna body and PCB 42, as also shown in FIG. 3. In this way, with no dielectric spacer or platform, antenna structure 40 is directly mountable to PCB 42. Consequently, the manufacturing time for assembly antenna 28 is reduced.

Supporting antenna body 44 over PCB 42 is a purpose of support legs 46. Ground leg 48 and feed leg 50 have additional functions other than supporting antenna body 44 over PCB 42. Particularly, ground leg 48 is electrically connected to ground plane 56 of PCB 42. Feed leg 50 is electrically connected to a transmission line (i.e., RF input) from receiver 22 to thereby electrically connect antenna 28 to the receiver. Receiver 22 is mounted on bottom side 54 of PCB 42 (not shown). Feed leg 50 provides electrical signals indicative of the communications received by antenna 28 to receiver 22. Other electronic components which may or may not be part of base station 12 may also be mounted on bottom side 54 of PCB 42.

By locating receiver 22 (i.e., an electronic component) on bottom side 54 of PCB 42, the receiver is separated from antenna body 44 by ground plane 56 of the PCB. This provides good RF isolation between receiver 22 and antenna body 44.

Feed leg 50 may also be electrically connected to a transmission line (i.e., RF output) from transmitter 24 to thereby electrically connect antenna 28 to the transmitter. Transmitter 24 is mounted on bottom side 54 of PCB 42 (not shown). Feed leg 50 provides electrical signals indicative of the communications received from transmitter 24 to antenna 28.

Ground leg 48 and feed leg 50 are located at respective predetermined locations of antenna body 44. Ground leg 48 and feed leg 50 are spaced apart by a predetermined distance to enhance the communication transmission and reception capabilities of antenna 28. In this way, antenna 28 is an inverted antenna.

Figure 4:
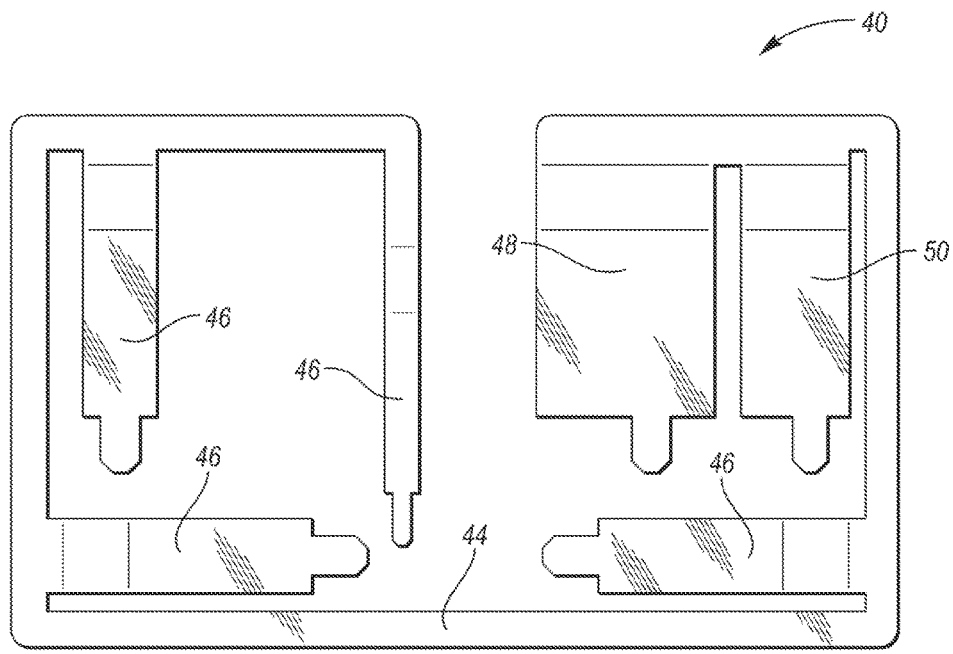
FIG. 4 illustrates a single metal blank from which an antenna structure of the antenna is formed.

Referring now to FIG. 4, with continual reference to FIG. 3, a single metal blank from which antenna structure 40 is formed is shown. The metal blank may be copper or any other electrically conductive metal. The metallic stamped design of antenna structure 40 entails forming the antenna structure from the metal blank, which is formed from a blanking process. Support legs 46, ground leg 48, and feed leg 50 are formed within the boundary of antenna body 44 of antenna structure 40. The metallic stamped design thereby reduces metal blanking scrap waste.

Figure 5A:
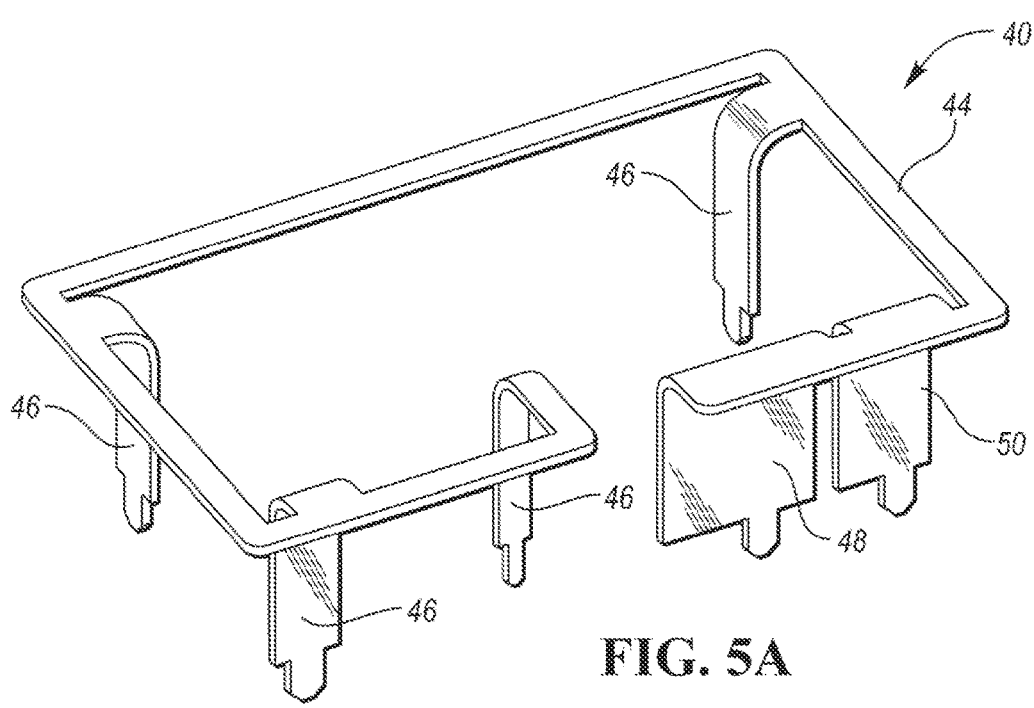
FIG. 5A illustrates a perspective top side view of the antenna structure of the antenna.
Figure 5B:
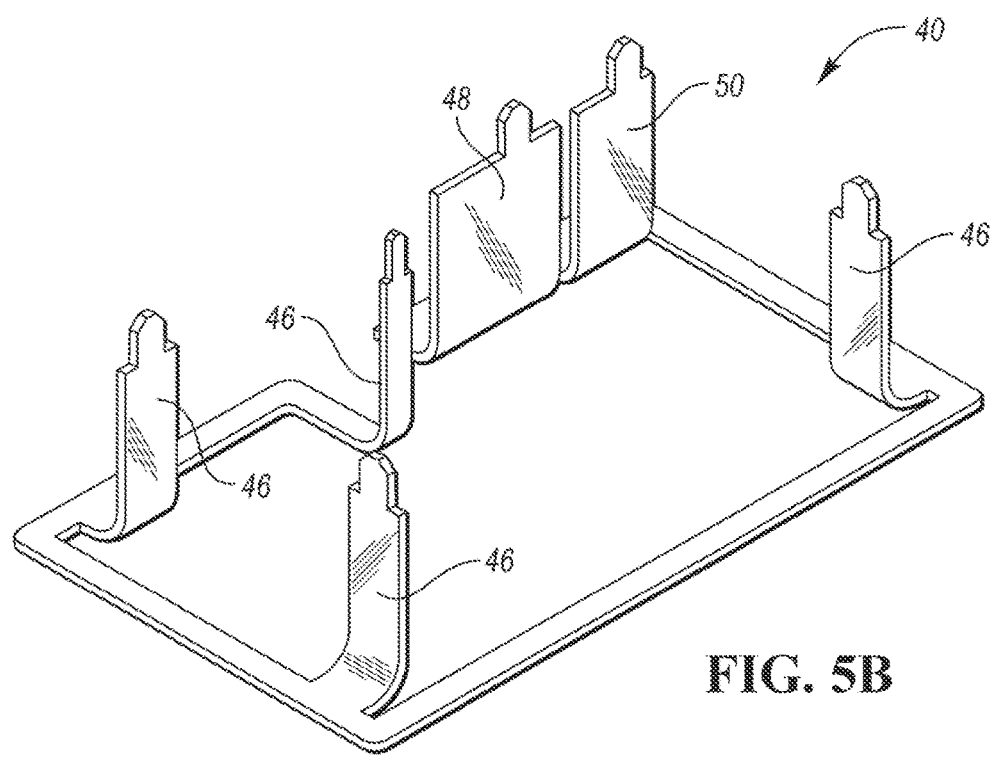
FIG. 5B illustrates a perspective bottom side view of the antenna structure of the antenna.

Referring now to FIGS. 5A and 5B, with continual reference to FIGS. 3 and 4, perspective top side and bottom side views of antenna structure 40 are respectively shown. In FIGS. 5A and 5B, support legs 46, ground leg 48, and feed leg 50 are bent out from the planar profile of the metal blank whereas antenna body 44 remains in the planar profile of the metal blank.

Although antenna body 44 is illustrated in FIGS. 3, 4, 5A, and 5B as having a rectangular profile, the antenna body may have different shapes and geometries, e.g., square, oval, circular, etc. In any of these configurations, antenna body 44 lies within a plane. Antenna body 44 may have different metal thicknesses than illustrated.

Antenna 28 is intended to provide long-range signal transmission and reception capabilities (e.g., 500 meters). In this way, antenna 28 is suitable for remote communications systems such as remote start applications requiring relatively long activation range. Antenna 28 advantageously achieves such performance while being associated with a reduced manufacturing cost. The reduced manufacturing cost results from the reduction in metal scrap of antenna 28 and the antenna being attached to PCB 42 using reflow soldering rather than compliant pins or heat staking.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An antenna comprising:
    a printed circuit board (PCB); and
    a metallic stamped antenna structure directly mounted on the PCB, the antenna structure including a lineal antenna body and a plurality of legs, the antenna body and the legs being unitary with one another, the antenna body having at least one antenna segment partially surrounding an interior devoid of the antenna body and forming a boundary of the antenna body, the at least one antenna segment and the interior devoid of the antenna body lying within a plane, the legs formed within the boundary of the antenna body and extending along the plane from at least one of the at least one antenna segment into the interior devoid of the antenna body and therefrom extending within the boundary of the antenna body out of the plane to the PCB and being mechanically mounted to the PCB within an orthogonal projection of the boundary of the antenna body onto the PCB to support the antenna body over the PCB with the antenna body lying above the PCB within the plane;
    wherein the antenna structure is made from a single metal blank having a planar profile; and
    wherein the legs are bent out from planar profile of the single metal blank with the antenna body remaining in the planar profile of the single metal blank.

2. The antenna of claim 1 wherein: the PCB includes a top side and a bottom side and a ground plane between the top side and the bottom side;
    the legs include a plurality of support legs, a ground leg, and a feed leg and the antenna body is supported by the legs over the top side of the PCB;
    the ground leg is electrically connected to the ground plane; and
    the feed leg is electrically connected to an electrical component to thereby electrically connect the antenna to the electrical component, wherein the electrical component is mounted either to the bottom side of the PCB or the top side of the PCB.

3. The antenna of claim 1 wherein: the plane is parallel to the PCB; and the legs have a same length such that the antenna body is spaced from the ground plane by a predetermined distance.

4. The antenna of claim 1 wherein: the legs are soldered to the PCB to be mechanically mounted to the PCB.

5. The antenna of claim 1 wherein: the legs are mechanically mounted to the PCB by using soldering, press fit pins, or mechanical contacts.

6. The antenna of claim 1 wherein: the antenna body has a rectangular configuration.

7. The antenna of claim 1 wherein: the antenna is for ultra-high frequency (UHF) communications.

8. A base station of a wireless remote-control system, comprising:
    an antenna;
    an electrical component electrically connected to the antenna, wherein the electrical component is a receiver for receiving communications via the antenna, a transmitter for transmitting communications via the antenna, and/or a transceiver for receiving and transmitting communications via the antenna;
    a controller for controlling a function of a target device in accordance with the communications; and
    wherein the antenna includes a printed circuit board (PCB) and a metallic stamped antenna structure directly mounted on the PCB, the antenna structure including a lineal antenna body and a plurality of legs, the antenna body and the legs being unitary with one another, the antenna body having at least one antenna segment partially surrounding an interior devoid of the antenna body and forming a boundary of the antenna body, the at least one antenna segment and the interior devoid of the antenna body lying within a plane, the legs formed within the boundary of the antenna body and extending along the plane from at least one of the at least one antenna segment into the interior devoid of the antenna body and therefrom extending within the boundary of the antenna body out of the plane to the PCB and being mechanically mounted to the PCB within an orthogonal projection of the boundary of the antenna body onto the PCB to support the antenna body over the PCB with the antenna body lying above the PCB within the plane;

wherein the antenna structure is made from a single metal blank having a planar profile; and wherein the legs are bent out from planar profile of the single metal blank with the antenna body remaining in the planar profile of the single metal blank.

9. The base station of claim 8 wherein:

the PCB includes a top side and a bottom side and a ground plane between the top side and the bottom side;

the legs include a plurality of support legs, a ground leg, and a feed leg and the antenna body is supported by the legs over the top side of the PCB;

the electrical component is mounted either to the bottom side of the PCB or the top side of the PCB;

the ground leg is electrically connected to the ground plane; and the feed leg is electrically connected to the electrical component to thereby electrically connect the electrical component to the antenna.

10. The base station of claim 8 wherein:

the plane is parallel to the PCB; and the legs have a same length such that the antenna body is spaced from the ground plane by a predetermined distance.

11. The base station of claim 8 wherein:

the legs are soldered to the PCB to be mechanically mounted to the PCB.

12. The base station of claim 8 wherein: the antenna body has a rectangular configuration.

13. The base station of claim 8 wherein: the target device is a vehicle.

14. The base station of claim 13 wherein:

the antenna is for receiving passive entry passive start (PEPS) communications and/or remote keyless entry (RKE) communications from a fob authorized to control the vehicle.

* * * * *